United States Patent

Finley

[15] 3,638,114
[45] Jan. 25, 1972

[54] SPLIT RANGE TRANSDUCER

[72] Inventor: Tom D. Finley, Hampton, Va.

[73] Assignee: The United States of America as represented by the Administrator of the National Aeronautics and Space Administration

[22] Filed: Dec. 31, 1969

[21] Appl. No.: 889,375

[52] U.S. Cl. .............................................324/115, 324/132
[51] Int. Cl. ...................................G01r 15/08, G01r 15/10
[58] Field of Search .......................324/115, 132, 131, 110; 307/318

[56] References Cited

UNITED STATES PATENTS

| 3,268,813 | 8/1966 | Pendleton | 324/132 |
| 3,210,663 | 10/1965 | Moseley et al. | 324/132 X |
| 2,789,254 | 4/1957 | Bodle et al. | 324/110 X |
| 3,365,617 | 1/1968 | Flanagan | 307/318 X |

FOREIGN PATENTS OR APPLICATIONS

| 343,027 | 1/1960 | Switzerland | 324/132 |

Primary Examiner—Rudolph V. Rolinec
Assistant Examiner—Ernest F. Karlsen
Attorney—William H. King, Howard J. Osborn and G. T. McCoy

[57] ABSTRACT

A nonlinear circuit connected to the output of a current-producing transducer to form a split range transducer. In the range where most of the data to be measured is expected, the resolution is high and in the other range the resolution is lower.

2 Claims, 2 Drawing Figures

PATENTED JAN 25 1972 3,638,114

INVENTOR.
TOM D. FINLEY
BY
*Howe Coy*
*William H. King*
ATTORNEYS

3,638,114

SPLIT RANGE TRANSDUCER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates generally to transducers and more specifically concerns a split range transducer that has a first resolution below a predetermined output value and a lesser second resolution above said predetermined output value.

Ordinarily a transducer will be ranged one and one-half to two times the expected maximum measured value to insure no loss of data. Even though there is no loss of data when this practice is used, the probable accuracy of the prime measured data is reduced since the resolution of the transducer in the range of the prime data is not as high as desirable. It is therefore the primary object of this invention to provide a transducer that has a high resolution in the range of most of the expected measured data and that has a lower resolution above said range to insure that the transducer is responsive to all data.

Another object of this invention is to provide a nonlinear circuit that can be connected to the output of a current-producing transducer to split the total range of the transducer into a first and a second range with the second range having a lower resolution than the first range.

SUMMARY OF THE INVENTION

The invention is applicable to any transducer that produces a current output. The current from the transducer is applied to a circuit consisting of first, second and third resistors connected in series between the output of the transducer and ground with back-to-back zener diodes connected between the output of the transducer and the junction of the second and third resistors. The voltage output of the circuit is at the junction of the first and second resistors. At low current outputs of the transducers, up to the breakdown of the zener diodes, the output voltages are directly proportional to the current. At high current outputs of the transducer, above the breakdown of the zener diodes, the voltage across the second resistor is held constant. Therefore, the only increase in the output voltage after breakdown of the zener diodes is the increase in voltage across the third resistor which is proportional to the increase in current. This gives two linear proportional to the increase in current. This gives two linear portions to the output voltage versus transducer current whereby the voltage rises rapidly to a certain level and then rises gradually to a maximum output.

DETAILED DESCRIPTION OF THE INVENTION

Figure 1:
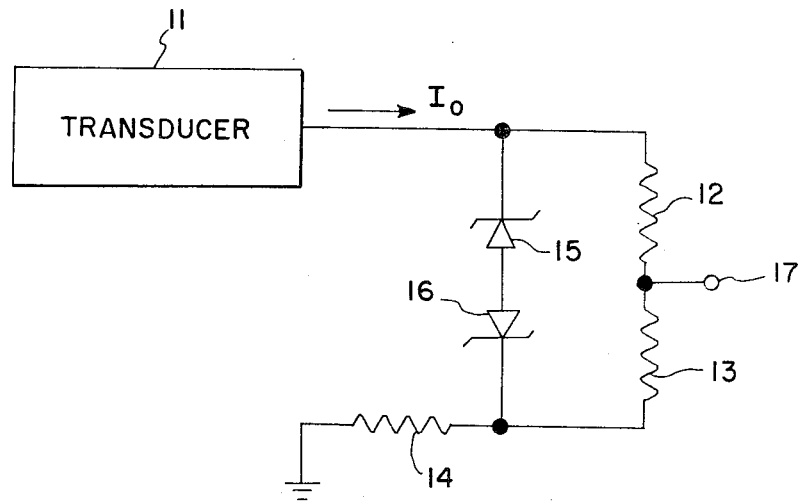
FIG. 1 is a schematic diagram of the invention.

Turning now to the embodiment of the invention selected for illustration in the drawings, the number 11 in FIG. 1 denotes a transducer, such as an accelerometer, that produces a current output. A resistor 12, a resistor 13 and a resistor 14 are connected in series between the output of transducer 11 and ground. Back-to-back zener diodes 15 and 16 are connected between the outputs of transducer 11 and the junction of resistors 13 and 14. The output of the circuit is a terminal 17 which is connected to the junction of resistors 12 and 13.

Figure 2:
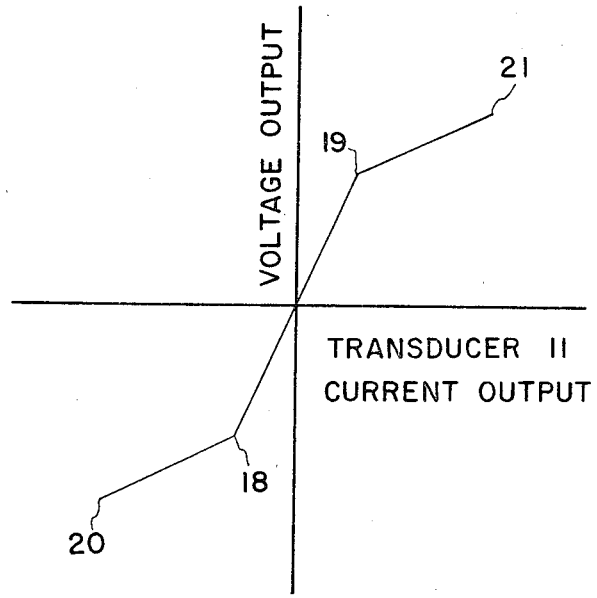
FIG. 2 is a graph of output voltage versus transducer current for the purpose of describing the operation the operation of the invention.

In the operation of this invention assume that transducer 11 is producing either a positive or negative current $I_o$ proportional to the variable being measured; and further assume that $I_o$ is not of sufficient magnitude to cause zener diodes 15 and 16 to break down. Then the voltage at output terminal 17 is equal to $(R_{13}+R_{14}) I_o$ where $R_{13}$ is the resistance in ohms of resistor 13, $R_{14}$ is the resistance in ohms of resistor 14 and $I_o$ is the current output of transducer 11 in amperes. If zener diodes 15 and 16 are not broken down (i.e., no current is flowing through the zener diodes) then the output at terminal 17 falls somewhere on the linear portion between points 18 and 19 on the curve in FIg. 2. Now assume that $I_o$ is of sufficient magnitude to cause zener diodes 15 and 16 to break down. Then the voltage across resistor 13 is held constant at $(R_{13}/R_{12}+R_{13}) V_z$ where $R_{12}$ is the resistance in ohms in resistor 12 and $V_z$ is the sum of the forward and backward breakdown voltages of zener diodes 15 and 16. Resistor 12 is used to form a voltage divider with resistor 13 to permit the use of higher voltage zener diodes. However, the invention will operate without the use of resistor 12. After breakdown of zener diodes 15 and 16 the only increase in the output is the increase across resistor 14 which is proportional to the increase in $I_o$. This gives two linear portions to the output voltages at terminal 17 versus transducer 11 current output ($I_o$) whereby if $I_o$ is positive the output voltages rise rapidly to point 19 on the curve and then rises gradually to the maximum output which is point 21 on the curve. If $I_o$ is negative the output voltage decreases rapidly to point 18 and the decreases gradually to point 20.

The advantage of this invention is that it retains high resolution in the measurement of low level current outputs of a transducer and still retains the capability of measuring high level outputs.

What is claimed as new and desired to be secured by Letters Patent of the United States is:

1. A split range measuring transducer circuit comprising: A transducer that produces a current proportional to the variable being measured; and means consisting of a first resistor and a second resistor connected in series between the output of said transducer and ground, and back-to-back zener diodes connected between the output of said transducer and the junction of said first and second resistors for producing across said first and second resistors a voltage equal to $k_1$ times said current while said current is below a predetermined value and for producing a voltage equal to a constant plus $k_2$ times said current while said current is above said predetermined value wherein $k_1$ is greater than $k_2$ whereby high resolution in the measurement of low levels of the variable is retained and the capability for measuring high levels of the variable is added.

2. A split range transducer according to claim 1 including a third resistor connected between the output of said transducer and said first resistor to make said third, first and second resistors in series between the output of the transducer and ground.

* * * * *